US010635073B2

(12) United States Patent
Bohner et al.

(10) Patent No.: US 10,635,073 B2
(45) Date of Patent: Apr. 28, 2020

(54) ELECTRONICALLY CONTROLLED SUBSTRATE WORKING APPARATUS

(71) Applicant: 2141632 Ontario Inc., Ingersoll (CA)

(72) Inventors: Stephan E. Bohner, Woodstock (CA); Alexander Kravets, Mississauga (CA)

(73) Assignee: 2141632 Ontario Inc., Ingersoll (CA)

( * ) Notice: Subject to any disclaimer, the term of this patent is extended or adjusted under 35 U.S.C. 154(b) by 148 days.

(21) Appl. No.: 15/405,279

(22) Filed: Jan. 12, 2017

(65) Prior Publication Data

US 2017/0205797 A1    Jul. 20, 2017

Related U.S. Application Data

(60) Provisional application No. 62/278,574, filed on Jan. 14, 2016.

(51) Int. Cl.
*G05B 19/18*    (2006.01)
*G05B 19/4065*    (2006.01)
*G05B 19/402*    (2006.01)

(52) U.S. Cl.
CPC ......... *G05B 19/182* (2013.01); *G05B 19/402* (2013.01); *G05B 19/4065* (2013.01);
(Continued)

(58) Field of Classification Search
CPC .............. G05B 19/182; G05B 19/402; G05B 19/4065; G05B 2219/45145; G05B 2219/50277
(Continued)

(56) References Cited

U.S. PATENT DOCUMENTS 5,822,212 A * 10/1998 Tanaka ............... G05B 19/4063
                                                    700/174
8,326,448 B2    12/2012 Schneider
(Continued)

FOREIGN PATENT DOCUMENTS

EP    1449615 A1 *  8/2004    ............. B23Q 17/09

*Primary Examiner* — Robert E Fennema
*Assistant Examiner* — Jigneshkumar C Patel
(74) *Attorney, Agent, or Firm* — Brunet & Co. Ltd.; Robert Brunet; Hans Koenig (57) ABSTRACT

An electronically controlled substrate working apparatus, such as a CNC controlled milling machine, drill press or lathe. The apparatus comprises a tool configured to remove material from the substrate, a spindle motor coupled to the tool, a feed motor configured to cause relative movement between the tool and the substrate along a feed path, a controller configured to control the spindle motor and the feed motor and a tool load measurement structure configured to provide a tool load value to the controller. The controller is configured to compare the load on the tool with stored or calculated first compliance values for a first location along the feed path and second compliance values for a second location along the feed path. The controller is further configured to cause the feed motor, the spindle motor or a combination thereof to take an action selected from a first set of response actions for the first location in the event that the load falls outside the first compliance values and to take an action selected from a second set of response actions for the second location in the event that the load falls outside the second compliance values. A method of operating the apparatus is also disclosed.

20 Claims, 4 Drawing Sheets

(52) U.S. Cl.
CPC .............. *G05B 2219/37342* (2013.01); *G05B 2219/45145* (2013.01); *G05B 2219/50277* (2013.01)

(58) Field of Classification Search
USPC ........................................................ 700/160
See application file for complete search history.

(56) References Cited

U.S. PATENT DOCUMENTS

| | | | |
|---|---|---|---|
| 2008/0141534 A1* | 6/2008 | Hilliard .................... | A61C 7/02 29/896.11 |
| 2010/0074701 A1* | 3/2010 | Kempen .................. | B23Q 5/52 408/1 R |
| 2010/0121478 A1* | 5/2010 | Jahn ...................... | G05B 19/404 700/173 |
| 2014/0379115 A1* | 12/2014 | Koyanaka .......... | G05B 19/4166 700/159 |

* cited by examiner

ELECTRONICALLY CONTROLLED SUBSTRATE WORKING APPARATUS

CROSS-REFERENCE TO RELATED APPLICATIONS

This application claims the benefit of U.S. Patent Application 62/278,574 filed Jan. 14, 2016, which is incorporated by reference herein in its entirety.

TECHNICAL FIELD

This disclosure relates to electronically controlled machines with tools for working substrates in order to form parts or work pieces, such as CNC controlled milling machines, drill presses and the like. More particularly, the disclosure relates to the control of said machines.

BACKGROUND

Computer numerically controlled (CNC) machines for working substrates, for example milling machines, drill presses, axial boring machines, lathes and the like, typically comprise a tool configured for motion relative to the substrate. The tool may be rotary (e.g. a drill bit) or non-rotary (e.g. a lathe chisel). The substrates may comprise metal, wood, plastic or ceramic. These machines are equipped with some form of electronic control for automated operation of the machine to form a part or work piece from the substrate.

In some machines, the electronic controls are capable of sensing a current draw of the motor connected to the rotary substrate working tool in order to issue an alarm and stop the tool in the event that an increase in current draw occurs, signifying an increase in torque associated with a jam that could potentially damage the tool or the machine.

However, the machines and supplied controls often suffer from one or more of the following problems: the set points for speed and torque are not readily user adjustable; the set points are not settable according to each individual part or work piece, but instead are settable for the machine globally; there is no ability to apply different set points at different locations on an individual work piece (for example, when the bit encounters a previously bored cross-hole of the work piece, leading to an expected change in torque); the machines are not pre-programmed to clear the jam and attempt to restart automatic operation; the machines are not programmed to account for expected increases in torque according to drill bit or tool wear over a monitored period of time; the machines are not programmed to issue an alarm or alert when a pre-determined amount of drill bit or tool wear has occurred. This results in increased tool wear, tool breakage and machine down-time.

There remains a need for improved electronically controlled machines for working substrates, particularly control hardware, software, systems and methods of operation of said machines, which address one or more of the above problems.

SUMMARY

There is provided an electronically controlled substrate working apparatus comprising: a tool configured to remove material from the substrate; a spindle motor coupled to the tool; a feed motor configured to cause relative movement between the tool and the substrate along a feed path; a controller configured to control the spindle motor and the feed motor; a tool load measurement structure configured to provide a tool load value to the controller; wherein the controller is configured to compare the load on the tool with stored or calculated first compliance values for a first location along the feed path and second compliance values for a second location along the feed path, the controller further configured to cause the feed motor, the spindle motor or a combination thereof to take an action selected from a first set of response actions for the first location in the event that the load falls outside the first compliance values and to take an action selected from a second set of response actions for the second location in the event that the load falls outside the second compliance values.

There is also provided a method of operating a substrate working apparatus comprising a tool configured to remove material from the substrate, a spindle motor coupled to the tool, a feed motor configured to cause relative movement between the tool and the substrate along a feed path, a controller configured to control the spindle motor and the feed motor, and a tool load measurement structure configured to provide a tool load value to the controller, the method comprising: comparing the tool load value with stored or calculated first compliance values for a first location along the feed path and second compliance values for a second location along the feed path; when the tool is at the first location and the load on the tool falls outside the first set of compliance values, causing the feed motor, the spindle motor or a combination thereof to take an action selected from a first set of response actions for the first location; and, when the tool is at the second location and the load on the tool falls outside the second set of compliance values, causing the feed motor, the spindle motor or a combination thereof to take an action selected from a second set of response actions for the second location.

The spindle motor may be configured to cause rotational movement of the tool about a tool axis. The feed path may be along the tool axis, perpendicular to the tool axis, or a combination thereof. The controller may be able to receive or accept an electronic part file into non-transient computer readable memory from which a microprocessor of the controller configured to execute software is able to determine the feed path. The controller may also be able to determine from the part file the first set of compliance values for the first location on the feed path and the second set of compliance values for the second location on the feed path, such as by reading them directly from the part file or by calculating them from information provided on the part file. For example, at least a portion of the first and second sets of compliance values may be calculated by the controller with reference to the part file as a function of a tool wear parameter comprising a logged operational time of the tool. The first set of compliance values may comprise a first maximum acceptable load at the first location on the feed path, a first minimum acceptable load at the first location on the feed path, or a combination thereof. The second set of compliance values may comprise a second maximum acceptable load at the second location on the feed path, a second minimum acceptable load at the second location on the feed path, or a combination thereof. Alternatively or in addition thereto, an operator may establish minimum and maximum acceptable loads for one or more locations on the feed path and enter those values into non-transient computer readable memory. In this way, an operator is able to use his or her experience and knowledge of the machine, the tool and the substrate to enter acceptable load values.

The part file may comprise first and second feed motor speeds for altering a movement speed of the tool at the first or second location on the feed path. The part file may comprise first and second spindle motor speeds for altering a rotational speed of the tool at the first or second location on the feed path.

The first or second set of response actions may comprise disengaging the tool from the substrate through action of the feed motor. The tool may be disengaged from the substrate by an amount sufficient to decrease the tool load value by a pre-determined amount. Alternatively, the tool may be disengaged from the substrate by a pre-determined distance. The tool may be re-engaged with the substrate for a pre-defined number of attempts or until the tool is able to continue along the feed path without the load falling outside of the first or second sets of compliance values. The first or second set of response actions may further comprise stopping the spindle motor and the feed motor and issuing an alarm when the pre-defined number of attempts is reached. A feed motor speed or a spindle motor speed may be variable when engaging and/or disengaging the tool with the substrate. The controller may thus be configured to ramp up or ramp down the feed motor speed or spindle motor speed when engaging or disengaging the tool with the substrate. This can advantageously reduce sudden shock loading on the tool, which can lead to undesirable tool breakage.

The tool load measurement structure may obtain a measurement of a rotational speed of the tool, a torque applied to the tool or a combination thereof. The tool load measurement structure may comprise current measurement structure electrically connected to the spindle motor, the feed motor, or a combination thereof. The current measurement structure may comprise an appropriate number of current transformers or resistive shunts, configured to measure a current drawn by the spindle motor, the feed motor, or both the spindle and feed motors. The tool load measurement structure may comprise a rotational speed measurement structure, such as a contact or non-contact tachometer, for example a rotary optical encoder or Hall effect transducer. The tool load measurement structure may comprise a torque measurement structure, such as a strain gauge. The tool load measurement structure may comprise a dynamometer. Any combination of the foregoing may be provided as part of the load measurement structure. The load measurement structure may comprise circuitry for interfacing with the various sensors prior to providing a signal to the controller or may provide the input from the sensors to the controller directly. The signal provided by the load measurement structure to the controller may be indicative of the measured variable or may be a composite signal calculated or otherwise interpreted by the load measurement structure prior to delivery to the controller. For example, persons of skill in the art will understand that motor current may be used to determine torque for a particular motor and either the current measurement itself or a torque value computed by the load measurement structure may be provided to the controller.

Further features will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
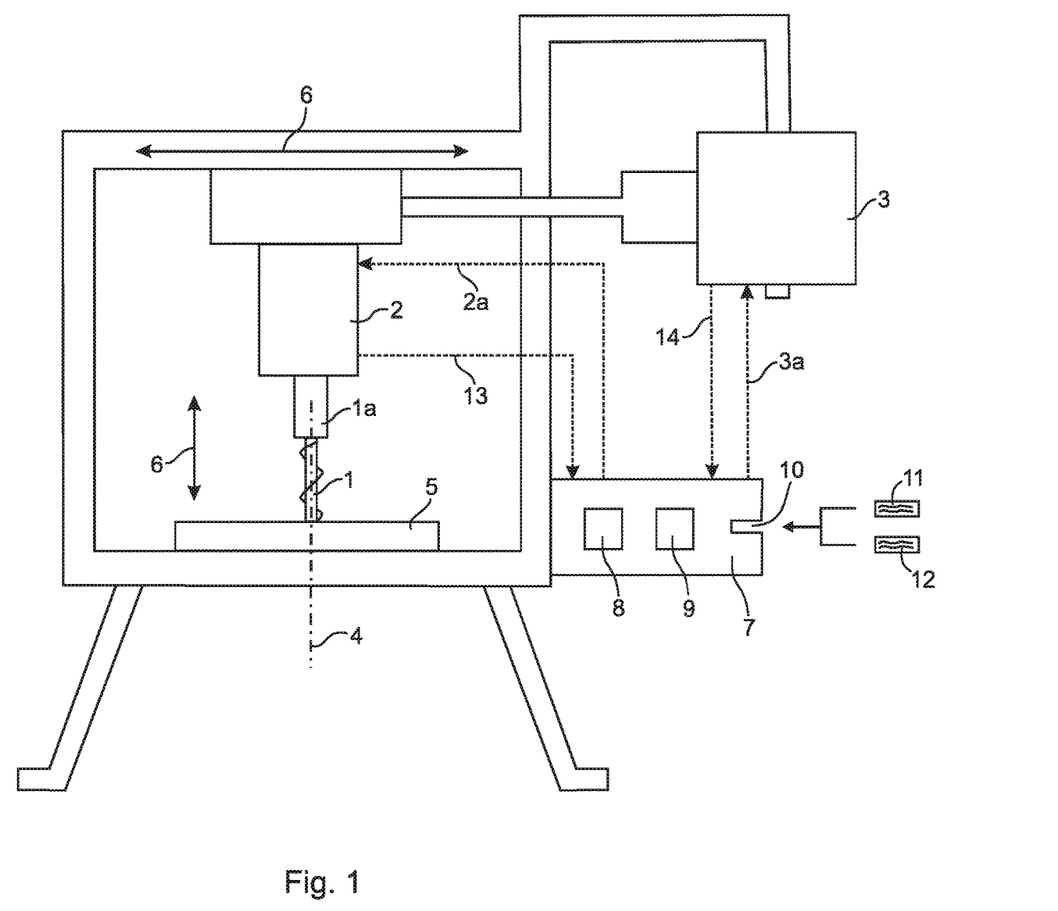
FIG. 1 is a schematic representation of an electronically controlled substrate working apparatus.

Referring to FIG. 1, an electronically controlled substrate working apparatus is schematically shown. The apparatus comprises a substrate working tool 1 coupled to a spindle motor 2 and a feed motor 3. In one embodiment (for example a milling machine), the spindle motor 2 is configured to provide rotary motion to the tool 1 about a tool axis 4 passing through the tool 1. In another embodiment (for example a lathe) the spindle motor 2 is configured to provide rotary motion to a substrate 5. This rotary motion may be provided through tool connection structure 1a comprising, for example, a transmission or other suitable power transfer means that allows the spindle motor 2 to be located wherever convenient while providing a desired torque and rotational speed to the tool 1 or substrate 5. The feed motor 3 is configured to provide relative movement between the tool 1 and the substrate 5 along a feed path 6. The feed path 6 allows for movement along the tool axis 4 as well as in a plane perpendicular to the tool axis. Persons of skill in the art will understand that the feed motor 3 may comprise a number of motors and associated drive structure (not shown) configured to achieve the desired relative movement between the tool 1 and substrate 5. Relative movement between the tool 1 and substrate 5 can be achieved by movement of the tool 1, movement of the substrate 5, or a combination thereof.

The apparatus is also equipped with a controller 7 (e.g. a Programmable Logic Controller, or PLC) that comprises non-transient electronic memory 8 and a microprocessor 9. A data interface 10 is provided for uploading data to the electronic memory 8. The data interface 10 is used to upload executable code 11 for execution by the microprocessor 9. The data interface 10 is also used to upload a part file 12 that contains an electronic representation of the part to be made by the apparatus from the substrate 5. The controller 7 has output channel 3a for controlling the feed motor 3, output channel 2a for controlling the spindle motor 2 and output channels for associated structure as previously described to achieve the desired movement of the tool 1 along the feed path 6. This allows the controller 7 to form the part represented by the part file 12 from the substrate 5.

The controller 7 also has one or more input channels for connection to tool load measurement structure 13. The tool load measurement structure 13 provides a tool load value to the controller 7, either in pre-processed digital form or analog form for appropriate further processing. The tool load value may be indicative of a torque applied to the tool or a power applied to the tool. In the case of a rotary tool, a measured tool rotational speed may also be provided to the controller 7, either through the tool load measurement structure 13 or through a separate input channel. Tool rotational speed may also be calculated based upon known information about spindle motor 2 and the tool connection structure (e.g. transmission gear ratios).

In one embodiment, the tool load measurement structure 13 comprises current measurement structure in the form of current transformers (not shown) to determine a current draw by the spindle motor 2. An increase in torque applied to the tool 1 is reflected in an increased current drawn by the spindle motor 2. Therefore, based upon known characteristics of the spindle motor 2 and associated tool connection structure, the current drawn by the spindle motor 2 may be used by the controller 7 to determine a load on the tool in the form of torque applied to the tool.

In another embodiment, the tool load measurement structure 13 comprises a strain gauge on the tool connection structure for measuring strain on the connection structure at a known distance from the tool axis 4, which can be used by the controller 7 to calculate a load on the tool in the form of torque applied to the tool.

Feed rate measurement structure 14 may be optionally provided to independently determine the speed of relative movement between the tool 1 and the substrate 5 along the feed path 6. The feed rate measurement structure 14 may use known contact or non-contact distance measurement techniques in conjunction with a chronometer. Since the controller 7 commands the feed motor 3 and spindle motor 2 to operate at a particular rate through the output channels, independent confirmation of feed rate and tool rotational speed is not strictly necessary. However, such independent confirmation provides for additional control and monitoring capabilities, including the ability to issue alarms in the event of deviation between the desired and measured speeds. Thus, feed rate and spindle rate may be amongst the set of compliance values.

The part file 12 uploaded via the data interface 10 may be in a variety of electronic file formats. In one embodiment, a part drawn on a conventional computer assisted design (CAD) program and saved in, for example, the DXF file format, may be compiled into a CNC part file 12 by software (executed by either a separate personal computer or by the controller 7) that contains dimensioning code to create movement patterns for the tool 1 in three dimensional space, based on pre-defined rules in the software. These movement patterns comprise a series of feed paths 6 for the tool 1. The CNC part file 12 is in text format and can be edited to include the compliance values at various locations along the feed path. Editing of the CNC part file 12 can take place before the part file is uploaded via the data interface 10, or afterwards by an operator of the machine based on experience with the apparatus, substrate 5, part being made and the tool 1.

The compliance values for a particular location reflect the maximum and optionally minimum permissible torque for that location. The compliance values may also include maximum and optionally minimum permissible rotational speed values and/or feed rate values along the feed path 6.

In another embodiment, the controller 7 automatically determines compliance values for a location along the feed path 6 in accordance with pre-defined rules for the apparatus, substrate 5, part features and the tool 1, optionally based on pre-defined feed rate and spindle rate. The automatic determination is completed by the controller 7 based on look-up tables with ranges of typically acceptable maximum and minimum compliance values for certain part features. These values are modifiable upwardly or downwardly by a percentage value based upon the feed rate and spindle rate to establish first estimates of the compliance values for that location along the feed path 6. The compliance values can ultimately be edited by the operator based on experience.

In some embodiments, the controller 7 automatically adjusts the compliance values based on a tool wear parameter, such as a part count or logged operational time of the tool 1. Alternatively, the compliance values may be manually adjusted by an operator of the apparatus based upon separately logged tool wear. In yet other embodiments, the compliance values are not adjusted for tool wear and are simply set conservatively to avoid tool breakage.

When the controller 7 determines that the tool load as provided by the tool measurement structure 13 falls outside of the range of compliance values, the controller determines which response action to take from amongst a set of possible response actions. The set of response actions may comprise one action or a plurality of actions. An increase in tool load above a maximum tool load compliance value for a given location on the feed path may be indicative of a jam between the tool 1 and the substrate 5. Jams can occur due to the presence of an un-cleared chip or fragment of the substrate 5 becoming wedged between the tool 1 and the substrate 5. A decrease in tool load below a minimum tool load compliance value for a given location on the feed path may be indicative of tool breakage, leading to unrestrained rotation of the spindle motor 2, or the encountering of a void or other material inconsistency along the feed path.

Compliance values are determined based upon location of the tool 1 along the feed path 6 in three-dimensional space. Therefore, the compliance values at a certain location on the plane perpendicular to the tool axis 4 may vary with position of the tool 1 along the tool axis. For example, in a drilling operation wherein the tool intersects a cross-bore of a previously drilled hole, an expected drop in torque will occur and any minimum load compliance value for that location on the plane will need to be lowered. Failure to do so could lead to a false indication of tool breakage.

Potential response actions to measured tool load falling outside of the range of compliance values for a particular location along the feed path include one or more of the following: stopping the tool; withdrawing the tool from engagement with the substrate; re-engaging the tool with the substrate; changing position of the tool to operate upon a different location on the feed path; and, issuing an alarm.

In one embodiment, in response to measured tool load exceeding a maximum load compliance value at a particular location along the feed path (which is indicative of the presence of a chip becoming jammed between the tool 1 and the substrate 5), the controller 7 will select a response action that causes the tool 1 to withdraw from engagement with the substrate 5 and automatically re-engage for a pre-defined number of attempts or until the tool is able to continue along the feed path without the measured load exceeding the maximum load compliance value. The response action comprises withdrawing the tool from engagement with the substrate 5 by a pre-determined distance along the feed path, either along the feed axis 4 or along the plane perpendicular to the feed axis. Alternatively, the response action comprises withdrawing the tool from engagement with the substrate 5 by an amount sufficient to decrease the tool load value by a pre-determined amount. In the event that the pre-defined number of attempts is reached, the controller 7 will select a further response action whereby the spindle motor 2 and feed motor 3 are stopped and an alarm is issued indicating that operator attention is required to clear the jam.

In one embodiment, in response to measured tool load being below a minimum load compliance value at a particular location along the feed path (which is indicative of tool breakage and unrestrained rotation of the spindle motor 2), the controller 7 will select a response action whereby the spindle motor 2 and feed motor 3 are stopped and an alarm is issued indicating that operator attention is required to replace the tool 1.

The speed of the feed motor 3 and or spindle motor 2 are typically variable to provide operational flexibility when making the part. In one embodiment, the speed of the feed motor 3 is varied when engaging the tool 1 with the substrate 5 and optionally when disengaging the tool from the substrate 5. By disengaging the tool 1 from the substrate 5 at a slower feed rate than the tool was previously advancing along the feed path, better overall control and reduced shock on the tool 1 is achieved. Similarly, by re-engaging the tool 1 with the substrate 5 at a slower feed rate than the usual feed rate, a more gradual loading of the tool 1 is achieved, which reduces the chance of tool breakage.

Figure 2:
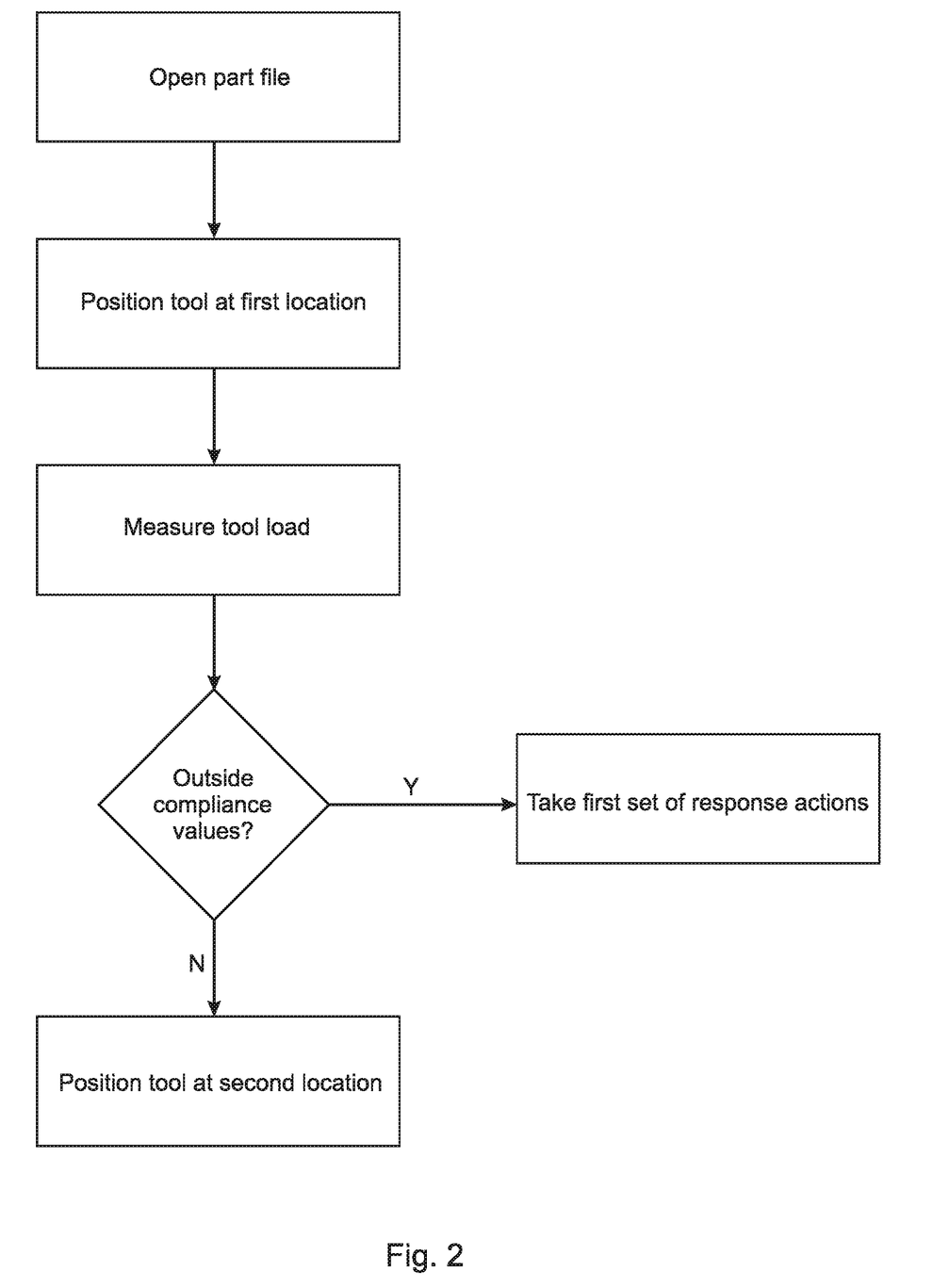
FIG. 2 is a flowchart depicting a method of operation of the apparatus.

Referring to FIG. 2, a method of operation of an apparatus as previously described includes the steps of comparing the measured tool load value with the compliance values at a particular location along the feed path. When the measured tool load value falls outside of the compliance values for that location, the controller 7 causes the feed motor 3, spindle motor 2 or a combination thereof to take an action selected from a first set of response actions as previously described.

Figure 3:
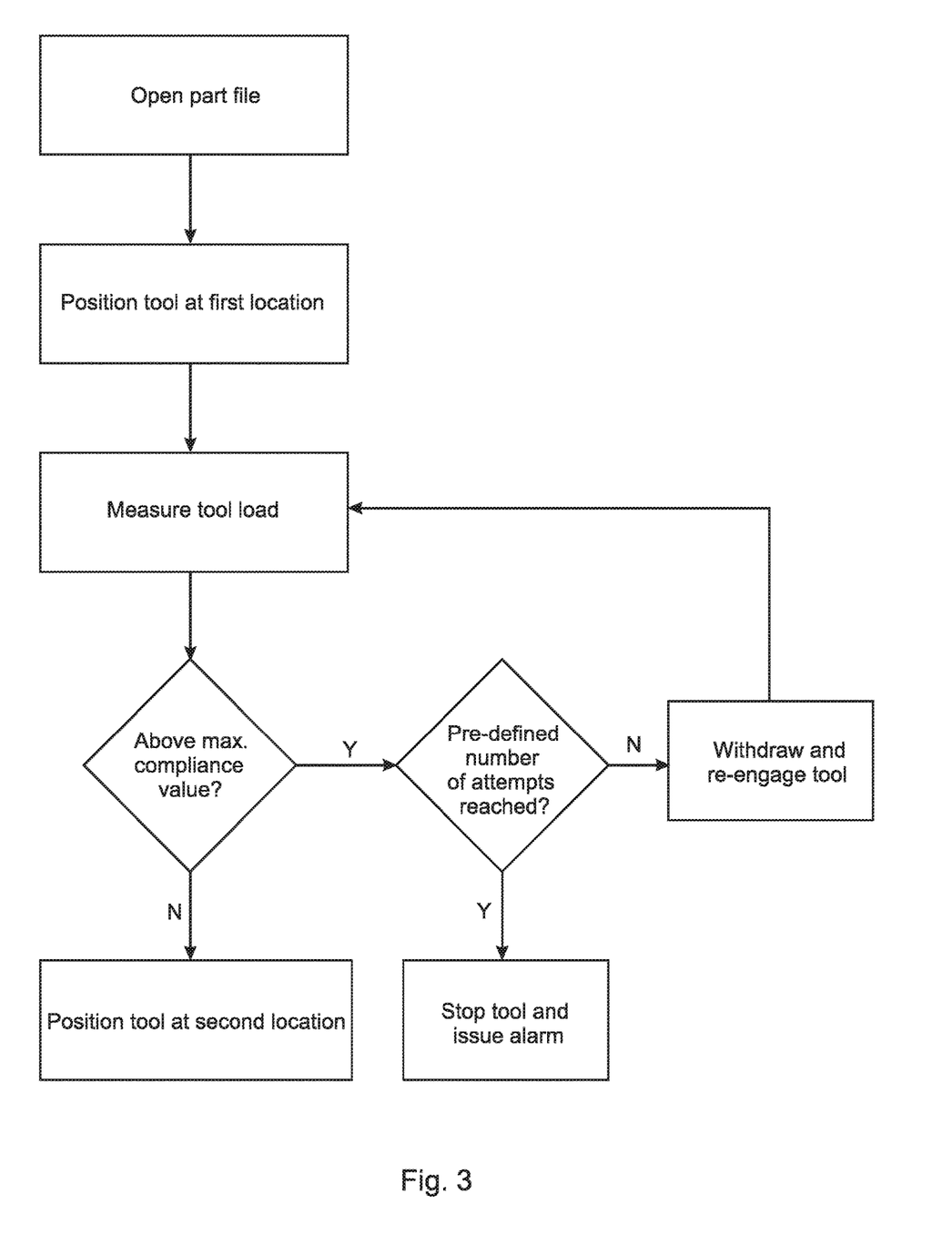
FIG. 3 is a flowchart depicting the method of FIG. 2, additionally including a response action; and, FIG. 4 is a flowchart depicting the method of FIG. 2, additionally including another response action.

Referring to FIG. 3, in one embodiment of the method, in response to measured tool load exceeding a maximum load compliance value at a particular location along the feed path, the controller selects a response action that causes the tool to withdraw from engagement with the substrate and automatically re-engage for a pre-defined number of attempts or until the tool is able to continue along the feed path without the measured load exceeding the maximum load compliance value. In the event that the pre-defined number of attempts is reached, the controller selects a further response action whereby the spindle motor and feed motor are stopped and an alarm is issued indicating that operator attention is required to clear the jam.

Figure 4:
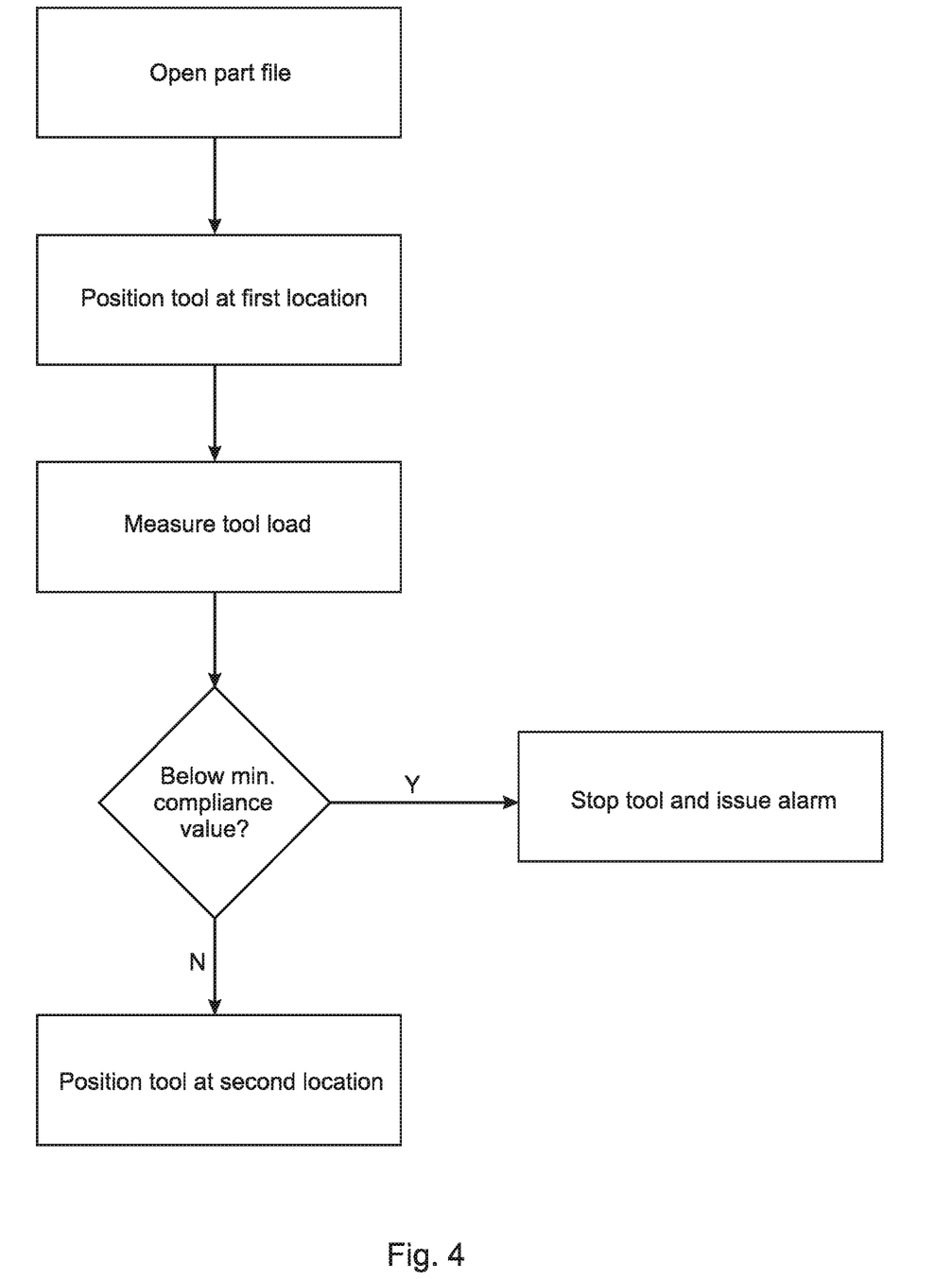

Referring to FIG. 4, in one embodiment of the method, in response to measured tool load being below a minimum load compliance value at a particular location along the feed path, the controller selects a response action whereby the spindle motor and feed motor are stopped and an alarm is issued indicating that operator attention is required to replace the tool.

Remaining features of the method will be apparent from the foregoing description.

The novel and inventive features of the present invention will become apparent to those of skill in the art upon examination of this disclosure as a whole. It should be understood, however, that the scope of the claims should not be limited by the preferred embodiments set forth herein, but should be given the broadest possible interpretation consistent with the specification. Although the inventors intend to claim all disclosed features and sub-combinations of the invention, the monopoly sought is defined by the scope of the claims.

The invention claimed is:

1. An electronically controlled substrate working apparatus operable in a three-dimensional space, comprising:
a tool configured to remove material from the substrate;
a spindle motor coupled to the tool;
a feed motor configured to cause relative movement between the tool and the substrate along a feed path in the three-dimensional space, wherein the feed path is specified in a part file, the part file storing data corresponding to each of a plurality of different spatial locations on the feed path from which respective sets of compliance values are determinable;
a controller configured to control the spindle motor and the feed motor;
a tool load measurement structure configured to provide a tool load value to the controller;
wherein the controller is configured to determine a variation of the load on the tool from each set of compliance values at each corresponding spatial location as the tool moves along the feed path,
wherein the controller is further configured to cause the feed motor, the spindle motor or a combination thereof to perform a response action at each location along the feed path in the event that the load falls outside the corresponding set of compliance values for that location, wherein the performed response action is selected from a plurality of different response actions according to the determined load variation; and,
wherein the controller is able to be provided with the part file from which the controller is able to determine the feed path and the sets of compliance values corresponding to the plurality of different spatial locations along the feed path, the part file containing an electronic representation of a part to be made by the apparatus from the substrate.

2. The apparatus of claim 1, wherein the spindle motor is configured to cause rotational movement of the tool about a tool axis and wherein the feed path is along the tool axis, perpendicular to the tool axis, or a combination thereof.

3. The apparatus of claim 1, wherein the part file comprises first and second feed motor speeds for altering a movement speed of the tool at the plurality of spatial locations on the feed path.

4. The apparatus of claim 1, wherein the spindle motor is configured to cause rotational movement of the tool about a tool axis and wherein the part file comprises first and second spindle motor speeds for altering a rotational speed of the tool at plurality of spatial locations on the feed path.

5. The apparatus of claim 1, wherein at least a portion of the sets of compliance values are calculated by the controller as a function of a tool wear parameter.

6. The apparatus of claim 1, wherein the sets of compliance values comprise maximum acceptable loads.

7. The apparatus of claim 6, wherein the sets of compliance values further comprises minimum acceptable loads.

8. The apparatus of claim 1, wherein the plurality of different response actions comprises disengaging the tool from the substrate through action of the feed motor and to re-engage the tool with the substrate for a pre-defined number of attempts or until the tool is able to continue along the feed path without the load falling outside of the sets of compliance values.

9. The apparatus of claim 8, wherein the plurality of different response actions further comprises stopping the spindle motor and the feed motor and issuing an alarm when the pre-defined number of attempts is reached.

10. The apparatus of claim 8, wherein the plurality of different response actions comprises disengaging the tool from the substrate by an amount sufficient to decrease the tool load value by a pre-determined amount before re-engaging the tool with the substrate.

11. The apparatus of claim 8, wherein the plurality of different response actions comprises disengaging the tool from the substrate by a pre-determined distance before re-engaging the tool with the substrate.

12. The apparatus of claim 8, wherein a feed motor speed is variable when engaging the tool with the substrate.

13. The apparatus of claim 12, wherein the feed motor speed is variable when dis-engaging the tool from the substrate.

14. The apparatus of claim 1, wherein the tool load measurement structure obtains a measurement of a rotational speed of the tool, a torque applied to the tool or a combination thereof.

15. The apparatus of claim 14, wherein the tool load measurement structure comprises current measurement structure electrically connected to the spindle motor, the feed motor, or a combination thereof.

16. A method of operating a substrate working apparatus in a three-dimensional space, comprising:
configuring a tool to remove material from the substrate, in which a spindle motor is coupled to the tool;
configuring a feed motor to cause relative movement between the tool and the substrate along a feed path in the three-dimensional space, wherein the feed path is specified in a part file, the part file storing data corresponding to each of a plurality of different spatial locations on the feed path from which respective sets of compliance values are determinable;
configuring a controller to control the spindle motor and the feed motor, and a tool load measurement structure configured to provide a tool load value to the controller, the method comprising:
determining a variation of the tool load value from each set of compliance values at each corresponding spatial location as the tool moves along the feed path;
wherein the controller is further configured to cause the feed motor, the spindle motor or a combination thereof to perform a response action at each location along the feed path in the event that the load falls outside the corresponding set of compliance values for that location, wherein the performed response action is selected from a plurality of different response actions according to the determined load variation;
wherein the controller is able to be provided with the part file, the part file containing an electronic representation of a part to be made by the apparatus from the substrate and containing information from which the controller is able to determine the feed path and the sets of compliance values corresponding to the different spatial locations along the feed path.

17. The method according to claim 16, wherein the plurality of different response actions comprises disengaging the tool from the substrate through action of the feed motor and to re-engage the tool with the substrate for a pre-defined number of attempts or until the tool is able to continue along the feed path without the load falling outside of the sets of compliance values.

18. The method according to claim 16, wherein the method further comprises calculating using the controller at least a portion of the sets of compliance values as a function of a tool wear parameter comprising a logged operational time of the tool.

19. The method according to claim 16, wherein the feed path describes a sequence of spatial locations along the part over which the tool traverses, the sequence including at least one previous and one subsequent spatial location, and wherein one or more compliance values in a set at a subsequent corresponding spatial location along the feed path are dependent on one or more compliance values in a set at a previous corresponding spatial location.

20. The method according to claim 16, wherein the feed path describes a sequence of spatial locations along the part over which the tool traverses, the sequence including at least one previous and one subsequent spatial location, and wherein an action of the tool performed at the subsequent spatial location is linked to an action of the tool performed at the previous spatial location.

* * * * *